UNITED STATES PATENT OFFICE.

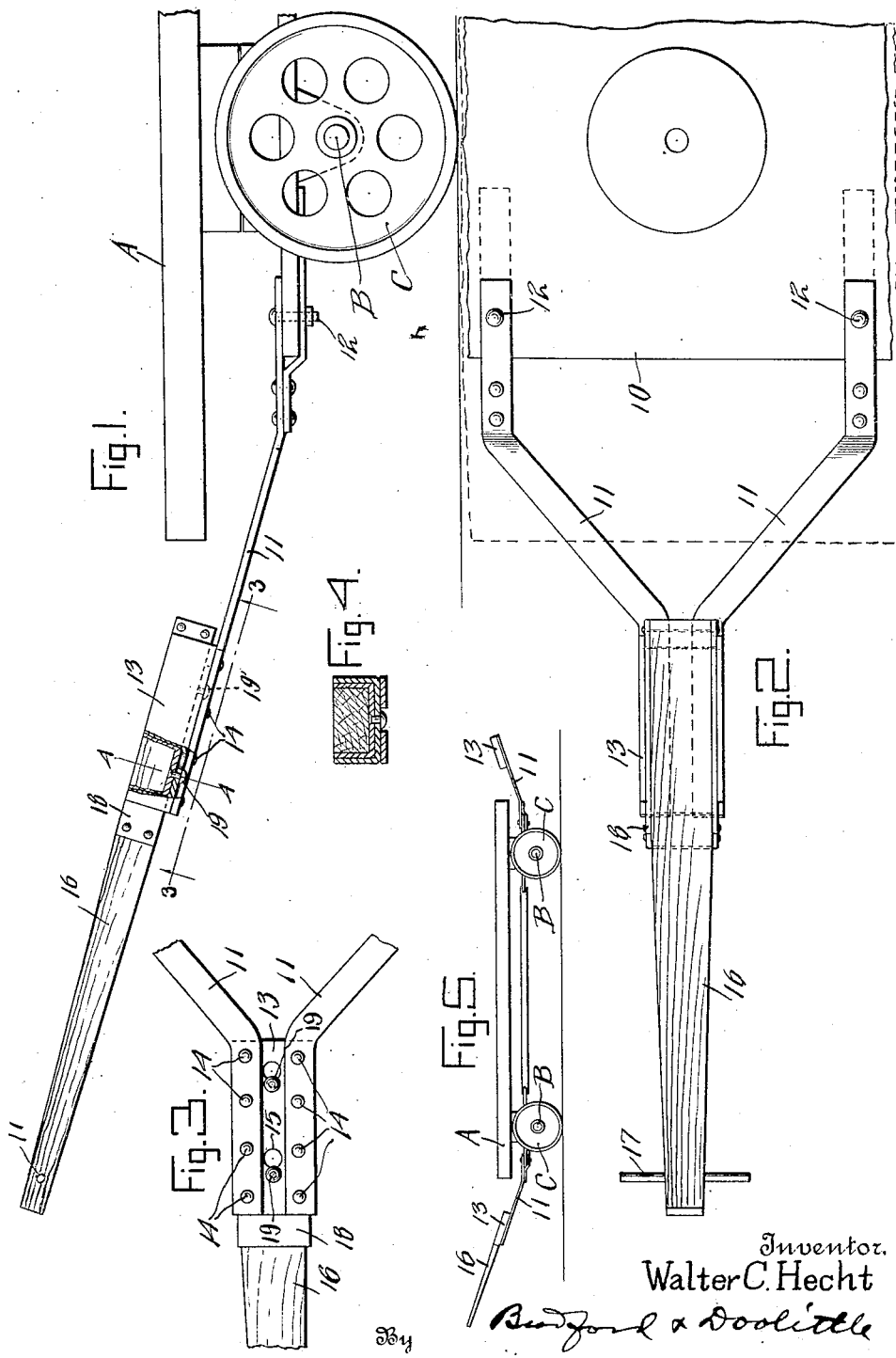

WALTER C. HECHT, OF NEWPORT NEWS, VIRGINIA.

DETACHABLE HANDLE FOR TRUCKS.

1,336,033.  Specification of Letters Patent.  Patented Apr. 6, 1920.

Application filed November 16, 1918. Serial No. 262,836.

*To all whom it may concern:*

Be it known that I, WALTER C. HECHT, a citizen of the United States, residing at Newport News, Warwick county, and State of Virginia, have invented and discovered certain new and useful Improvements in Detachable Handles for Trucks, of which the following is a specification.

My said invention relates to a removable tongue for vehicles, particularly trailers, of a type that are commonly employed in baggage rooms and other places of similar nature, especially adapted to be attached behind motor baggage trucks and the like, my improvement consisting in providing a tongue by which the truck's trailer can be manipulated by hand separately when detached from the motor truck. It consists in certain improvements in the details of construction of the devices on the trailer as well as on the tongue whereby it may be quickly and conveniently attached and detached, all as will be hereafter more fully described and claimed.

Referring to the accompanying drawing which is made a part hereof and on which similar reference characters indicate similar parts, Figure 1 is an elevation of one end of the truck trailer having one of my detachable tongues attached thereto, Fig. 2, a top or plan view of the same, Fig. 3, a detail view showing an underside plan at the point where the tongue is attached.

Fig. 4, a cross-section on the dotted line 4—4 in Fig. 1, and

Fig. 5, a detail view of a complete vehicle of the character referred to.

In said drawings, the portions marked A represent the platform or body proper, B the axles, and C the wheels.

These several parts are or may be of any appropriate construction and arrangement such as are ordinarily employed for the purpose stated, and require no special description.

A plate or frame 10 forming a part of the running gear is attached to each axle and attached to each of said parts 10 are hounds 11, secured thereto by bolts 12 and approaching each other at their outer ends where they are parallel for a distance and connected by a housing or flanged plate 13, channel-shaped in cross-section is secured to the hounds by bolts or rivets 14. Said plate 13 has keyhole-shaped slots 15, large at the end nearest the center of the trailer, to receive the heads of attaching members, and narrow at the other end, as shown most clearly in Fig. 3.

The tongue 16 has a cross-piece 17 near its front end for convenience in operating and at its rear end is incased in a channel-shaped metal housing 18 which is securely riveted thereto and is adapted to fit within the housing or plate 13. Said member 18 carries a pair of projecting pins 19 provided with heads which are adapted to be inserted in the large ends of the slots 15, when the tongue 16 may be drawn forward to engage the pins 19 with the heads under the narrow portions of said slots and secure the tongue in position.

Both ends of the truck are fitted with similar parts including hounds 11 and housings 13, as shown. This provides a convenient and ready means for attachment at either end of the trailer to the motor truck and when detached the tongue 16 may be readily attached to either end for the purpose of manipulating the truck by hand, it being only necessary to insert the heads of pins 19 in the large end of the slots 15 and draw the tongue forward to attach the same. For detaching it is only necesary to push the tongue back until the heads of the pins 19 register with the large ends of the slots 15, when it may readily be lifted out of position. By this means a trailer truck is provided with a means for ready attachment to the motor and also for hand manipulation.

Having thus fully described my said invention, what I claim as new and desire to secure by Letters Patent is:

1. The combination with a truck-trailer having truck-engaging means at both ends, of a tongue having means to connect rigidly with the engaging means by a movement away from the center of the trailer and to disconnect by a reverse movement.

2. The combination with a wheeled vehicle, of an attaching member provided with key-hole slots having their larger ends toward the center of the vehicle, a tongue and headed pins carried by the tongue proportioned and positioned to enter the larger ends of the slots and to be moved to the smaller ends by stress applied to draw the vehicle.

In witness whereof I have hereunto set my hand and seal at Newport News, Virginia, this 9th day of November, A. D. nineteen hundred and eighteen.

WALTER C. HECHT. [L. S.]

Witnesses:
 ALBERT C. ELDER,
 WHITNEY A. SCHMITT.